(12) United States Patent
Sakama et al.

(10) Patent No.: US 7,405,664 B2
(45) Date of Patent: Jul. 29, 2008

(54) RADIO FREQUENCY IC TAG AND METHOD FOR MANUFACTURING THE SAME

(75) Inventors: Isao Sakama, Hiratsuka (JP); Minoru Ashizawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 133 days.

(21) Appl. No.: 11/052,804

(22) Filed: Feb. 9, 2005

(65) Prior Publication Data

US 2005/0275539 A1    Dec. 15, 2005

(30) Foreign Application Priority Data

Jun. 11, 2004   (JP)   ............................ 2004-173566
Nov. 30, 2004   (JP)   ............................ 2004-345335

(51) Int. Cl.
G08B 13/14    (2006.01)
H01Q 1/38     (2006.01)
H05K 3/02     (2006.01)

(52) U.S. Cl. .................... 340/572.7; 156/250; 257/673; 29/846; 29/847; 343/700 MS; 361/748

(58) Field of Classification Search ........................ None
See application file for complete search history.

(56) References Cited

U.S. PATENT DOCUMENTS

| 6,018,299 A | 1/2000 | Eberhardt | |
| 6,107,920 A * | 8/2000 | Eberhardt et al. | ........ 340/572.7 |
| 2002/0135525 A1 | 9/2002 | Ikegaya et al. | |
| 2004/0027292 A1 | 2/2004 | Gabriel et al. | |
| 2006/0244605 A1 * | 11/2006 | Sakama et al. | ........... 340/572.7 |

FOREIGN PATENT DOCUMENTS

| JP | 2001-053535 | 2/2001 |
| JP | 2003-243918 | 8/2003 |
| WO | 99/65002 | 12/1999 |

* cited by examiner

*Primary Examiner*—Julie Lieu
(74) *Attorney, Agent, or Firm*—Mattingly, Stanger, Malur & Brundidge, P.C.

(57) ABSTRACT

A radio frequency IC tag and a manufacturing method for the same includes an IC chip on which information is stored, and an antenna for transmitting the information that is stored on the IC chip. In the antenna, a power-feeding part on which the IC chip is mounted extends along a direction in which an electric current flows. Radiation parts are formed so that the width of the radiation parts becomes wider than that of the power-feeding part with respect to the longitudinal axis of the power-feeding part. The radiation parts extend from the power-feeding part, at both sides thereof, along the direction in which the electric current flows.

25 Claims, 11 Drawing Sheets

RADIO FREQUENCY IC TAG AND METHOD FOR MANUFACTURING THE SAME

CROSS-REFERENCES TO RELATED APPLICATIONS

This application claims priority based on Japanese Patent Application No. 2004-173566, filed Jun. 11, 2004, and Japanese Patent Application No. 2004-345335, filed Nov. 30, 2004, both of which are incorporated herein by reference.

BACKGROUND OF THE INVENTION

In recent years, radio frequency IC tags have become widely used for information management and distribution management of commodities, articles, and the like. Moreover, these radio frequency IC tags are also coming into common use for the identification and management of animals. Such radio frequency IC tags usually include a small IC chip on which information is stored, and a small antenna for transmitting information stored in the IC chip by, such as by radio frequency transmission, other electromagnetic energy transmission, or the like, as is known in the art. (See, for example, U.S. Pat. No. 6,617,172 to Usami, and U.S. patent application Ser. No. 10/513,995, to Oozeki, filed Sep. 3, 2003, both of which are incorporated by reference herein in their entireties.) To be more specific, such a radio frequency IC tag may be equipped with a small IC chip having a width of about 0.4 mm, a length of about 0.4 mm, and the height of about 0.1 mm, for example, in proximity to the central portion of a rectangular antenna.

The radio frequency IC tag is attached to a commodity, animal, or the like, in actual use. Therefore, if a reader is put over the radio frequency IC tag, it is possible to read out, in a non-contact manner, information that is to the IC chip (that is, information about, for example, attributes of an individual commodity or those of an individual animal) To attach such a radio frequency IC tag to a commodity or an animal, it is desirable that the radio frequency IC tag be configured as small as possible. For this purpose, it is necessary to reduce the size of an antenna of the radio frequency IC tag.

FIGS. 12A, 12B are diagrams each illustrating a configuration of a dipole antenna in the conventional radio frequency IC tag. As shown in FIG. 12A, an IC chip 17 is mounted on the central part of a dipole antenna 21. The length L' of the dipole antenna 21 is λ/2 so that the dipole antenna 21 can achieve the maximum antenna efficiency. Here, λ denotes the wavelength in the frequency to be used. Therefore, under the prior art, in order to reduce the size of the radio frequency IC tag, for example, part of the dipole antenna 21 might be cut off for use, as shown in FIG. 12B.

However, because the maximum antenna efficiency is obtained when the antenna length L' of the dipole antenna is λ/2. Therefore, if as shown in FIG. 12B the antenna is cut off in the longitudinal direction to miniaturize the radio frequency IC tag, the antenna efficiency decreases, which causes the communication distance to be shortened, resulting in difficult communications. Consequently, it may become impossible to read out information stored in the IC chip. FIG. 13 is a diagram representing characteristics of a dipole antenna having a shape as shown in FIGS. 12A-12B, and illustrates the relationship between the antenna length L' (in mm) and the communication distance S (in mm). As shown in FIG. 13, if the antenna length L' is shortened, the communication distance S (mm) rapidly decreases. For example, if the antenna width D' is fixed at a value of 1.5 mm, the graph of FIG. 13 illustrates that it becomes impossible to carry out communications when the antenna length L' becomes 25 mm or less.

In addition, a technique used in microstrip antennas is also known. In this technique, the central part of an antenna is narrowed, and both end parts extending along the direction in which an electric current flows are widened. In other words, the antenna is configured as an H-shaped antenna to reduce the size of the antenna. This technique is intended for reducing the size of antennas by concentrating the magnetic field in a thin constriction of the H type antenna to increase the inductance so that a resonance frequency is decreased. (See, for example, Japanese Patent Laid-Open No. 2001-53535, paragraph numbers 0015 through 0023, and FIGS. 1 and 2, which is hereinafter referred to as "Patent document 1".) Further, a technique used in non-contact IC tags using an H-shaped antenna is also known. This technique achieves a reduction in the size of non-contact IC tags by applying ohmic contact to a connected part of an H type antenna. (See, for example, Japanese Patent Laid-Open No. 2003-243918, paragraph numbers 0012 through 0027, and FIGS. 1 through 4, which is hereinafter referred to as "Patent document 2".)

However, the H type antenna disclosed in the above-mentioned patent document 1 is a so-called microstrip antenna comprising an H-shaped patch electrode formed on a surface of a dielectric and a ground electrode formed on the back surface thereof. The microstrip antenna is utilized as a small-size antenna for cellular phones. The microstrip antenna cannot be applied to a strip antenna having no ground electrode as it is. Further, what is realized in the antenna disclosed in the above-mentioned patent document 2 is a non-contact IC tag that is intended for the miniaturization by use of an H-shaped antenna. However, when the H-shaped antenna is configured by use of two wide antenna patterns that are symmetrically formed on a substrate, and an IC tag label that bridges these antenna patterns, the antenna patterns and the IC tag label are connected in ohmic contact.

To be more specific, in a manufacturing process of the non-contact IC tag, the IC tag label is directly mounted on the antenna patterns to make an ohmic contact in a state in which film coating is not performed on the substrate on which the antenna patterns are formed. The technique in the patent document 2, therefore, cannot coat with a film between the two wide antenna patterns and the antenna patterns equipped with the IC chip to bridge in the manufacturing process of the H type antenna. In other words, a non-contact IC tag that configures an H type antenna by means of electrostatic capacitive coupling cannot be manufactured by utilizing the known conventional manufacturing processes.

SUMMARY OF THE INVENTION

The present invention has been devised in view of the above-discussed problems. An object of the present invention is to provide an inexpensive radio frequency IC tag that is capable of achieving wide directivity with a small antenna, that is capable of communicating information without sacrificing communication distance, and that has a small-size and thin structure, while also providing a manufacturing method for manufacturing such a radio frequency IC tag. Yet another object of the present invention is to provide a radio frequency IC tag that is allowed to have an antenna shape suitable for a shape of a case for storing the radio frequency IC tag.

In order to achieve the above-mentioned objects, according to one aspect of the present invention, there is provided a radio frequency IC tag comprising: an IC chip to which information is stored; and an antenna for transmitting by radio, or the like, the information that is stored on the IC chip; wherein: in the antenna, a power-feeding part equipped with the IC chip extends rectangularly along a direction in which an electric current flows, and radiation parts are formed so that the width of the radiation parts become wider than that of the power-feeding part with respect to a longitudinal axis of the power-feeding part, and the radiation parts extend from the power-feeding part at both sides thereof along the direction in which the electric current flows.

For example, the power-feeding part is centrally located, and the radiation parts extend from both sides of the power-feeding part to form an H-shaped antenna. In another case, each of the radiation parts extending from both sides of the power-feeding part are formed into a semicircular shape, and the power-feeding part with the radiation parts extending from both sides may thus form an antenna having a circular or oval shape. In addition, an insulation film is provided between the power-feeding part and the radiation parts, and the power-feeding part and the radiation parts are electrically connected to each other not by ohmic contact but by electrostatic capacitive coupling to form an antenna.

Moreover, a radio frequency IC tag according to the present invention can achieve the maximum antenna efficiency by positioning the power-feeding part equipped with the IC chip at a position where the radiation parts become symmetric in the up and down direction (the vertical direction, i.e., the direction perpendicular to the direction of the antenna current) and also in the right and left direction (the horizontal direction, i.e., the direction of antenna current). However, if a shape of a case for storing the radio frequency IC tag is subject to some constraints, the power-feeding part can be positioned at a position where the radiation parts become asymmetric at least either in the up-and-down direction or in the right-and-left direction. Further, if a shape of the case is subject to some constraints, the radiation part may be provided with one or more openings having an arbitrary shape at an arbitrary position thereof. In another case, the radiation part may be provided with one or more notches having an arbitrary shape at an arbitrary position on the outer circumference thereof. If such a changed antenna is used, the antenna efficiency slightly decreases from the maximum efficiency. However, this antenna efficiency is higher than that of a dipole antenna. Accordingly, if higher priority is given to the convenience of attaching to an object, it is also possible to adopt such a changed antenna.

DETAILED DESCRIPTION OF THE INVENTION

Figure 1:
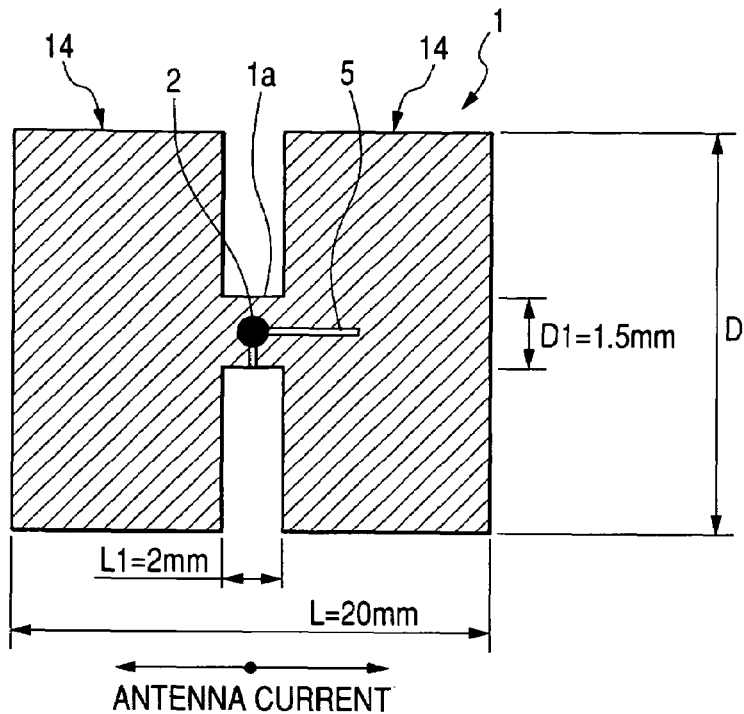
FIG. 1 is a plan view illustrating an H type antenna used in a radio frequency IC tag according to a first embodiment of the present invention.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. With reference to the drawings, a radio frequency IC tag according to the best mode for embodying the present invention (hereinafter referred to as "embodiment") will be described with suitable examples given below. The radio frequency IC tag according to the present invention is an improvement in antenna efficiency. This is achieved by narrowing the width of a central part equipped with an IC chip and used as a power-feeding part, and by adopting an antenna shape that is symmetrically widened in peripheral parts that are used as radiation parts (for example, adopting an H shape as the antenna shape) so that the energy is efficiently concentrated around the IC chip. Accordingly, even if the length of the antenna is shortened, the communication distance is not reduced. As a result, it is possible to miniaturize the radio frequency IC tag.

First Embodiment

FIG. 1 is a plan view illustrating an H type antenna used in a radio frequency IC tag according to a first embodiment of the present invention. As shown in FIG. 1, an H type antenna 1 used in the radio frequency IC tag has a so-called H shape in which the antenna width D1 is narrowed in the central part of the antenna forming a constriction 1a extending in a direction of a length L1 while the antenna width D is widened at both side parts (peripheral radiation parts) 14 of the antenna 1 extending in the direction of the length L. In addition, an IC chip 2 is mounted on the central part of the H type antenna 1. The H type antenna 1 functions as a strip antenna. The H type antenna 1 takes preventive measures against electrostatic discharge damage, and performs impedance matching. Therefore, a consecutive key-shaped (or L-shaped) slit 5 is formed in the central part equipped with the IC chip 2 in such a manner that the IC chip 2 is placed across the slit 5, and the terminals of the IC chip 2 are electrically connected on each side of the slit 5. Accordingly, the above-mentioned constriction 1a at central part becomes a power-feeding part for feeding antenna current; and both side parts (peripheral parts) 14 become radiation parts for emitting an antenna radio wave. The central constriction 1a is generally rectangular in this embodiment, and the radiation parts 14 are also rectangular but of greater width than the constriction 1a, thereby forming an antenna that resembles an "H".

Thus, widening the antenna width D in both side parts of the H type antenna 1 extending in the direction of the length L (longitudinal direction) makes it possible to obtain the maximum current in the central part (that is, constriction 1a) of the H type antenna 1 to which the IC chip 2 is connected. As a result, the electromagnetic energy is concentrated on the peripheral radiation parts 14 of the antenna which surround the IC chip 2. Accordingly, if the antenna width D of the H type antenna 1 is set at a specified value, even if the length L is shortened the antenna efficiency increases, leading to an improvement in communication distance. To be more specific, in the case of the conventional microstrip antenna that is formed of a ground electrode and a patch electrode, even if the patch electrode is configured to have an H shape, an IC chip cannot be mounted on the patch electrode. Therefore, the magnetic field is concentrated after all, resulting in an increase in inductance. Accordingly, although an effect of decreasing the resonance frequency is produced, an improvement in communication distance is not attained. In contrast, since the H type antenna 1 of this embodiment functions as a strip antenna that does not need a ground electrode, the IC chip 2 can be mounted on the central part constriction 1a of the antenna, where the electromagnetic energy is most concentrated, creating a power-feeding part. As a result, the antenna efficiency is improved, which makes it possible to improve the communication distance.

Figure 2:
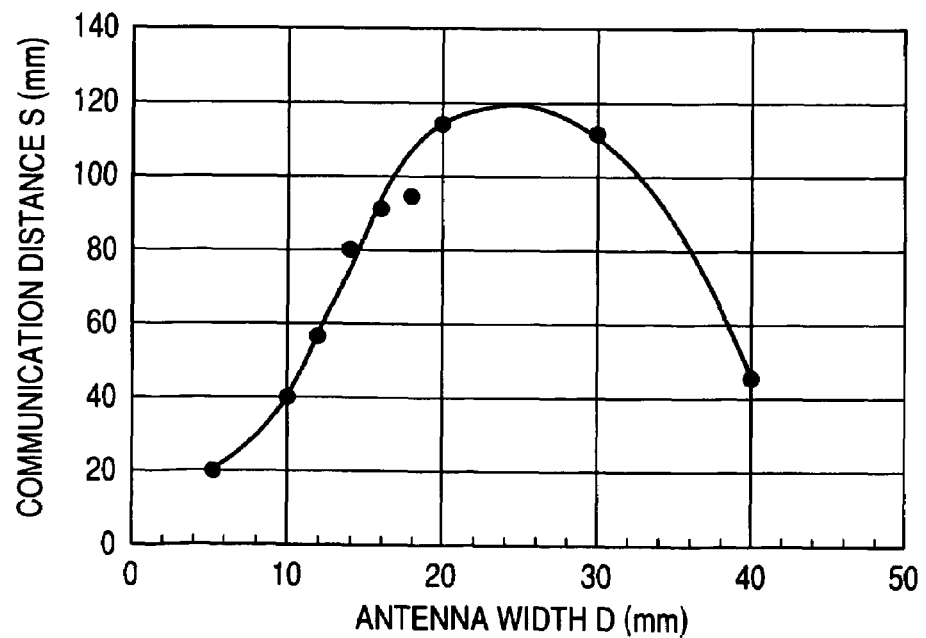
FIG. 2 is a diagram representing characteristics of the H type antenna shown in FIG. 1, and illustrates the relationship between the antenna width D (in mm) and the communication distance S (in mm)

FIG. 2 is a diagram representing characteristics of the H type antenna shown in FIG. 1, and illustrates the relationship between the antenna width and the communication distance. In FIG. 2, the horizontal axis indicates the antenna width D (in mm), whereas the vertical axis indicates the communication distance S (in mm). To be more specific, what is illustrated in FIG. 2 is experimental data showing the relationship between the antenna width D and the communication distance S. The experimental data was obtained by performing an experiment in which the antenna width D of the H type antenna 1 shown in FIG. 1 is changed with the length L, the constriction length L1 in the longitudinal direction, and the constriction width D1 in the lateral direction being set at 20 mm, 2 mm, and 1.5 mm, respectively.

As shown in FIG. 2, on the condition that the antenna length L is a constant (20 mm), the antenna width D is changed. In this case, when the antenna width D is 40 mm or less, it is possible to carry out communications. When the antenna width D is 24 mm, the communication distance S is 119 mm, which is the maximum communication distance. More specifically, as shown in FIG. 1, the IC chip 2 is mounted on the constriction 1a in the central part of the H type antenna 1. When an antenna current flows along the direction of the length L from the constriction of the H type antenna 1 toward widened peripheral radiation parts 14 at both sides, the maximum current is measured at the constriction while the electric current spreads over the widened peripheral parts 14 at both sides. At this time, the electromagnetic energy of the widened peripheral parts 14 at both sides is concentrated on the constriction 1a (that is, the part equipped with the IC chip 2) in the central part of the H type antenna 1. Accordingly, the antenna efficiency is improved.

As a result of the effect of concentrating the electromagnetic energy, even if a small-size H type antenna is used (for example, the H type antenna 1, the length L of which is 20 mm, and the antenna width D of which is about 20 mm), the antenna efficiency is improved, which makes it possible to improve the communication distance. Incidentally, when a square antenna having no constriction is used in which the antenna length L is 20 mm and the antenna width D is 20 mm, the electromagnetic energy cannot be concentrated. Therefore, the antenna efficiency is not improved, and it is difficult to improve the communication distance. In addition, in the case of a U-shaped antenna, in which the central part is narrowed (that is, a shape corresponding to only the upper half of the H type antenna shown in FIG. 1, including the constriction), the electromagnetic energy spreads over the widened peripheral parts. Accordingly, it is difficult to effectively concentrate the electromagnetic energy on the constriction (that is, the part equipped with the IC chip). Therefore, because it is not possible to improve the antenna efficiency to the same extent as that of the H type antenna, the communication distance cannot be sufficiently improved although an effect of improving the communication distance is produced to some extent.

FIGS. 3A through 3D are diagrams each illustrating as an example a manufacturing process of the H type antenna shown in FIG. 1 according to the first embodiment.

What will be described here is a manufacturing method for manufacturing a radio frequency IC tag 10, the manufacturing method including a first process, a second process, and a third process. More specifically, the first process is a process in which when a metallic conductor is used to form an antenna on a surface of an insulative substrate, the central part constriction 1a is patterned into a rectangular shape, and peripheral radiation parts 14 extending at both sides along the longitudinal direction of the central part are patterned so that the width of the peripheral parts 14 becomes wider than the width of the central part constriction 1a with respect to the longitudinal direction of the central part constriction 1a. The second process is a process in which an IC chip 2 is mounted on the central part constriction 1a, and each terminal of the IC chip 2 is connected to the metallic conductor across a slit 5 formed in the central part constriction 1a. The third process is a process of coating, with an isolation (insulation) cover 4, the metallic conductor forming the central part constriction 1a and the peripheral radiation parts 14, and the IC chip 2.

Incidentally, in the first process, the peripheral parts 14 may also be symmetrically patterned with respect to the axis of the central part constriction 1a in the longitudinal direction.

Figure 3A:
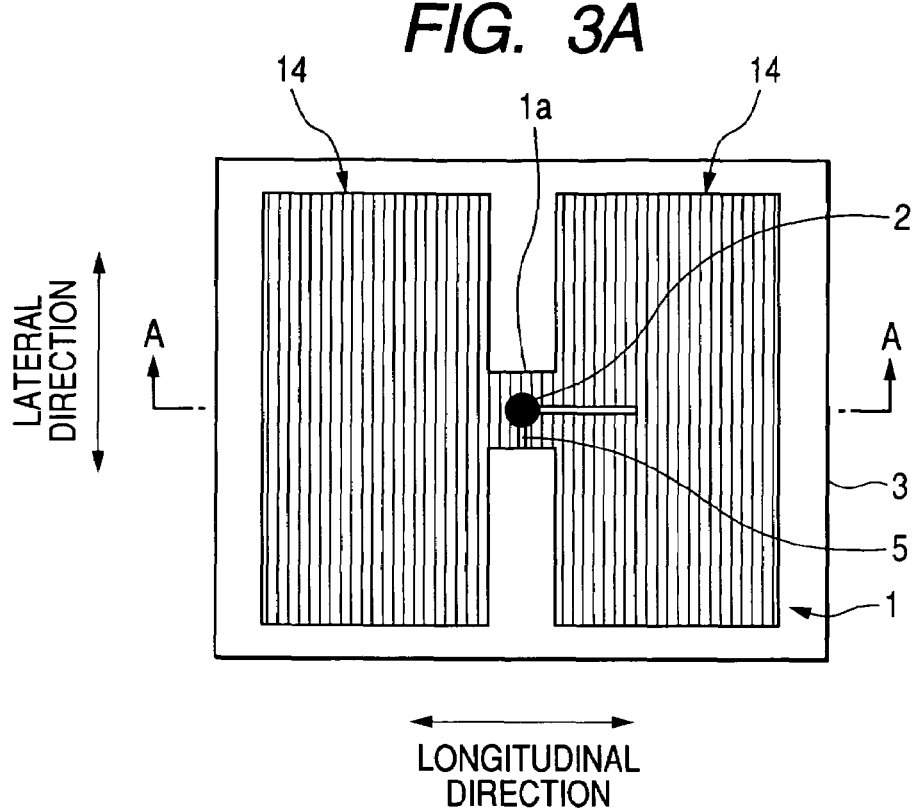
FIGS. 3A through 3C are diagrams each illustrating as an example a manufacturing process of manufacturing the H type antenna shown in FIG. 1 according to the first embodiment.
Figure 3B:
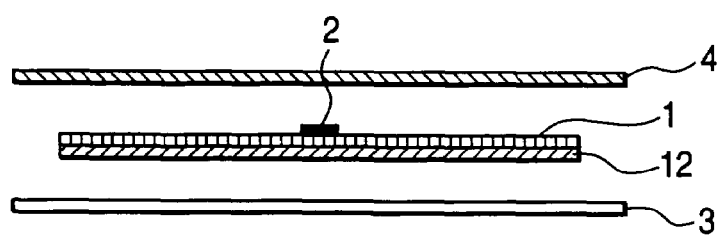

As shown in FIG. 3B, a metallic conductor such as copper, silver, etc., is patterned into an H shape on a surface of an antenna base material 12. For example, metallic paste, such as copper, is printed patterning to form an H-shaped pattern and printed out; or a metallic pattern layer is plated to form an H-shaped pattern; or a thin metal film is etched to form an H-shaped pattern. In this case, as shown in FIG. 3A, the H type antenna 1 is provided with a consecutive key-shaped slit 5 at the constriction 1a in the central part thereof. It is to be noted that as described above, this slit 5 is provided in order to take preventive measures against electrostatic discharge damage to the IC chip 2, and to perform impedance matching. Moreover, the IC chip 2 is placed across the slit 5 in the longitudinal direction of the H type antenna 1, and electrodes of the IC chip 2 are connected to metal parts on both sides of the slit 5 (the IC chip 2 is connected across the slit 5). FIG. 3B is a cross section of FIG. 3A, taken along line A-A.

Figure 3C:
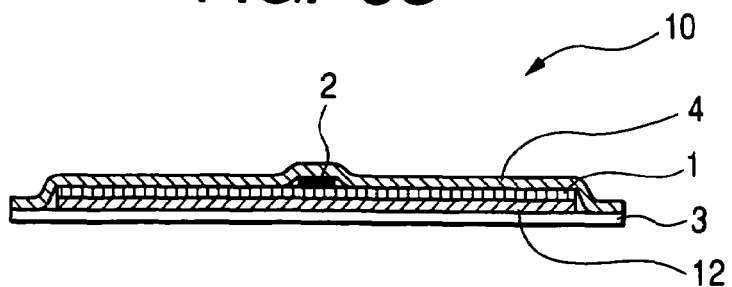

Next, as shown in FIG. 3B, an adhesive sheet 3 is provided on the antenna base material 12 side; and a waterproof and insulative cover seal 4 is coated on the surface of the H type antenna 1. As a result, a waterproof radio frequency IC tag 10 as shown in FIG. 3C is formed. To be more specific, what is formed is a thin, square, and small-size radio frequency IC tag 10 having a length of 22 mm in the longitudinal direction, a width of 22 mm in the lateral direction, and a thickness of about 1 mm.

Figure 4A:
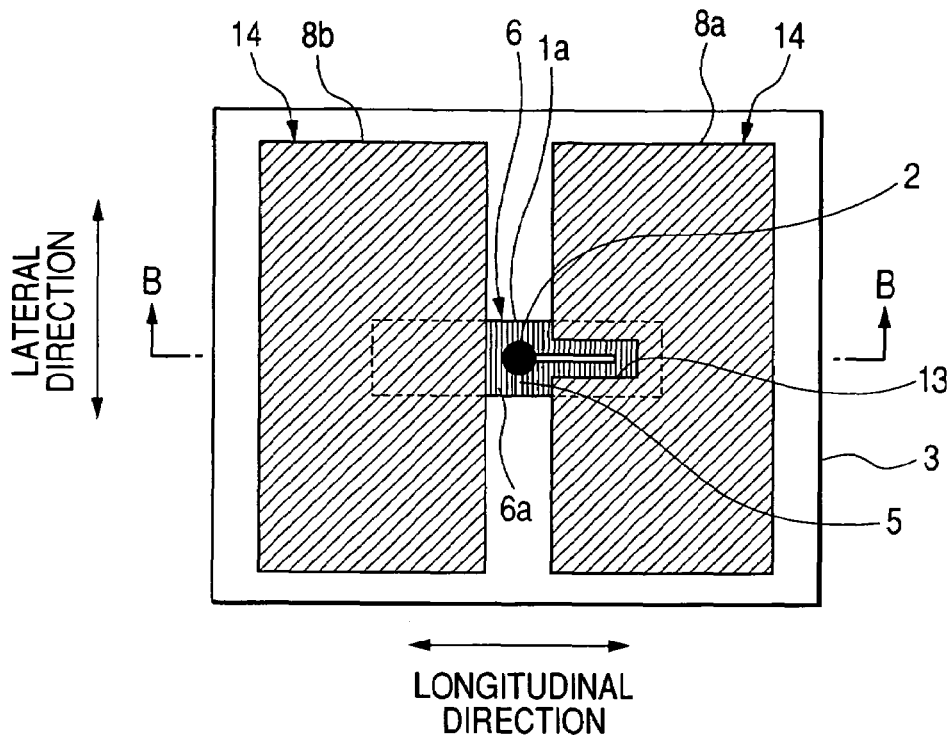
FIGS. 4A through 4C are diagrams each illustrating as an example a manufacturing process of manufacturing a H type antenna according to another embodiment.
Figure 4B:
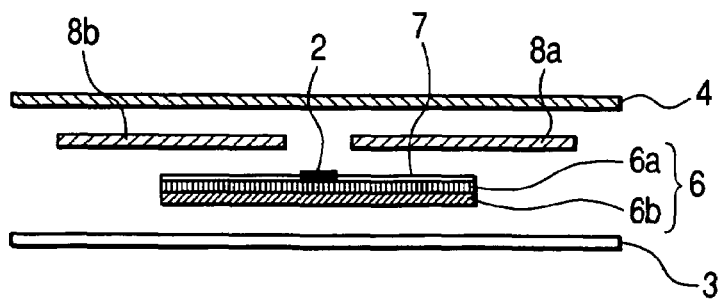
Figure 4C:
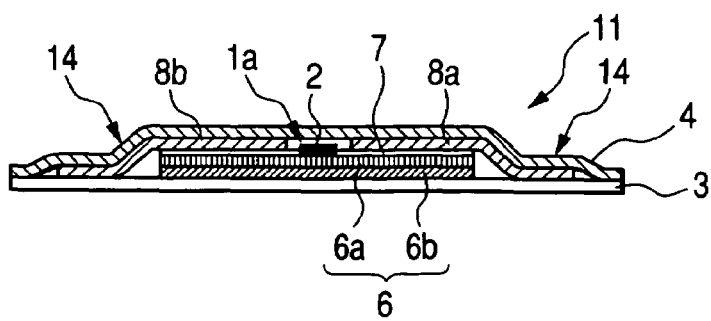

Next, a manufacturing process of manufacturing an H type antenna 11 according to another embodiment will be described. FIGS. 4A through 4C are diagrams, each illustrating as an example a manufacturing process of manufacturing an H type antenna according to another embodiment. Here, peripheral parts 14 extending at both sides of the central part element 6 (forming a constriction 1a) are formed as auxiliary antennas 8a, 8b. The auxiliary antennas 8a, 8b are connected to the central part element 6 by electrostatic capacitive coupling.

The manufacturing process includes: a first process in which an antenna 6a is patterned with a metallic conductor on the surface of the antenna base material 6b; a second process in which the IC chip 2 is placed in the central part constriction 1a of the antenna 6a, and each terminal of the IC chip 2 is connected to the antenna 6a (each terminal is connected to the antenna across a slit 5); a third process in which an insulation film 7 is coated on the surface of the antenna 6a; a fourth process in which over a wide area including the insulation film 7 on the antenna 6a, the first auxiliary antenna 8a and the second auxiliary antenna 8b are formed across the IC chip 2; and a fifth process in which the whole surface including the first auxiliary antenna 8a, the second auxiliary antenna 8b, and the IC chip 2 are coated with an isolation cover 4.

As shown in FIG. 4B, on a surface of the antenna base material 6b, a metallic conductor such as copper, silver, etc. is used to pattern the antenna 6a having a rectangular shape in the longitudinal direction. The patterning of the antenna 6a is achieved by performing pattern printing of metallic paste such as copper to print out the pattern, or by plating a metallic pattern layer, or by etching a thin metal film. In this case, as shown in FIG. 4A, the antenna 6a is provided with a consecutive key-shaped slit 5 at the constriction 1a in the central part thereof. Moreover, the IC chip 2 is placed across the slit 5 in the longitudinal direction of the antenna 6a, and each electrode of the IC chip 2 is connected to the antenna 6a (the IC chip 2 is connected to the antenna across the slit 5). Incidentally, FIG. 4B is a B-B cross section of FIG. 4A.

Further, as shown in FIG. 4B, the insulation film 7 is coated on the surface of the antenna 6a. This makes it possible to form an element 6 into which the antenna base material 6b including the insulation film 7, the antenna 6a, and the IC chip 2 are integrated.

Next, the adhesive sheet 3 is placed on the antenna base material 6b side of the element 6, and then the first auxiliary antenna 8a and the second auxiliary antenna 8b are formed with the IC chip 2 sandwiched therebetween over a wide area including the insulation film 7 on the antenna 6a by pattern printing, plating, etching, or the like. Thus, an H type antenna as shown in FIG. 4A is formed.

After forming such an H type antenna, as shown in FIG. 4B, an insulative cover seal 4 is coated on the whole surface of the adhesive sheet 3 including the element 6, the first auxiliary antenna 8a, and the second auxiliary antenna 8b. As a result, a radio frequency IC tag 11 as shown in FIG. 4C is formed. To be more specific, as is the case with FIG. 3, what is formed is a thin, square, and small-size radio frequency IC tag 11 having a length of 22 mm in the longitudinal direction, a width of 22 mm in the lateral direction, and a thickness of about 1 mm.

It is to be noted that the antenna base material 6b is used here to reinforce the antenna 6a, and accordingly it is also possible to omit the antenna base material 6b if necessary, and to form the antenna 6a directly on the adhesive sheet 3.

In the fourth process illustrated in FIG. 4B, because the first auxiliary antenna 8a and the second auxiliary antenna 8b are formed on the surface of the antenna 6a of the element 6 through the insulation film 7, the antenna 6a, the first auxiliary antenna 8a, and the second auxiliary antenna 8b are coupled not by ohmic contact but by electrostatic capacitive coupling. Because a high-frequency current flows through the H type antenna formed in this manner, electrical connection between the antenna 6a and the first auxiliary antenna 8a and the second auxiliary antenna 8b is sufficiently made although the connection is electrostatic capacitive coupling. Thus, central part constriction 1a acts as a power-feeding part, and auxiliary antennas 8a, 8b act as radiation parts.

Incidentally, the ohmic contact is contact having no diode (rectification) characteristic; in other words, the ohmic contact is contact according to characteristics of the electric current and voltage in which Ohm's law holds. The electrostatic capacitive coupling is coupling that forms a capacitor by placing a dielectric between conductive metals or other conductive materials.

In the case of the ohmic contact, it is necessary to use anisotropic conductive adhesive for the connection between the antenna and the IC chip so as to cause an electric current to flow. In contrast, in this embodiment, because the antenna 6a, the first auxiliary antenna 8a, and the second auxiliary antenna 8b are coupled by the electrostatic capacitive coupling, it is possible to form a capacitor used for the electrostatic capacitive coupling by making use of the insulation film 7 as a dielectric (insulation material) as described above. Thus, a material used in other processes, such as a resist material, a sticky material, and an adhesive material, is made use of as a dielectric between the antenna 6a and the first auxiliary antenna 8a and the second auxiliary antenna 8b, and thereby it is possible to form a capacitor.

This eliminates the need for expensive anisotropic conductive adhesive material, which makes it possible to simplify the manufacturing process and to reduce the material cost, leading to a reduction in overall product cost.

Incidentally, in FIG. 4A, the first auxiliary antenna 8a is provided with a gap 13 for the antenna 6a formed with slit 5. However, the second auxiliary antenna 8b may also be provided with gap 13, or both the first auxiliary antenna 8a and the second auxiliary antenna 8b may also be provided with gap 13. If both of the first auxiliary antenna 8a and the second auxiliary antenna 8b are provided with gap 13, it is not necessary to take a direction of the antenna 6a into consideration when the radio frequency IC tag is manufactured.

Second Embodiment

Figure 5:
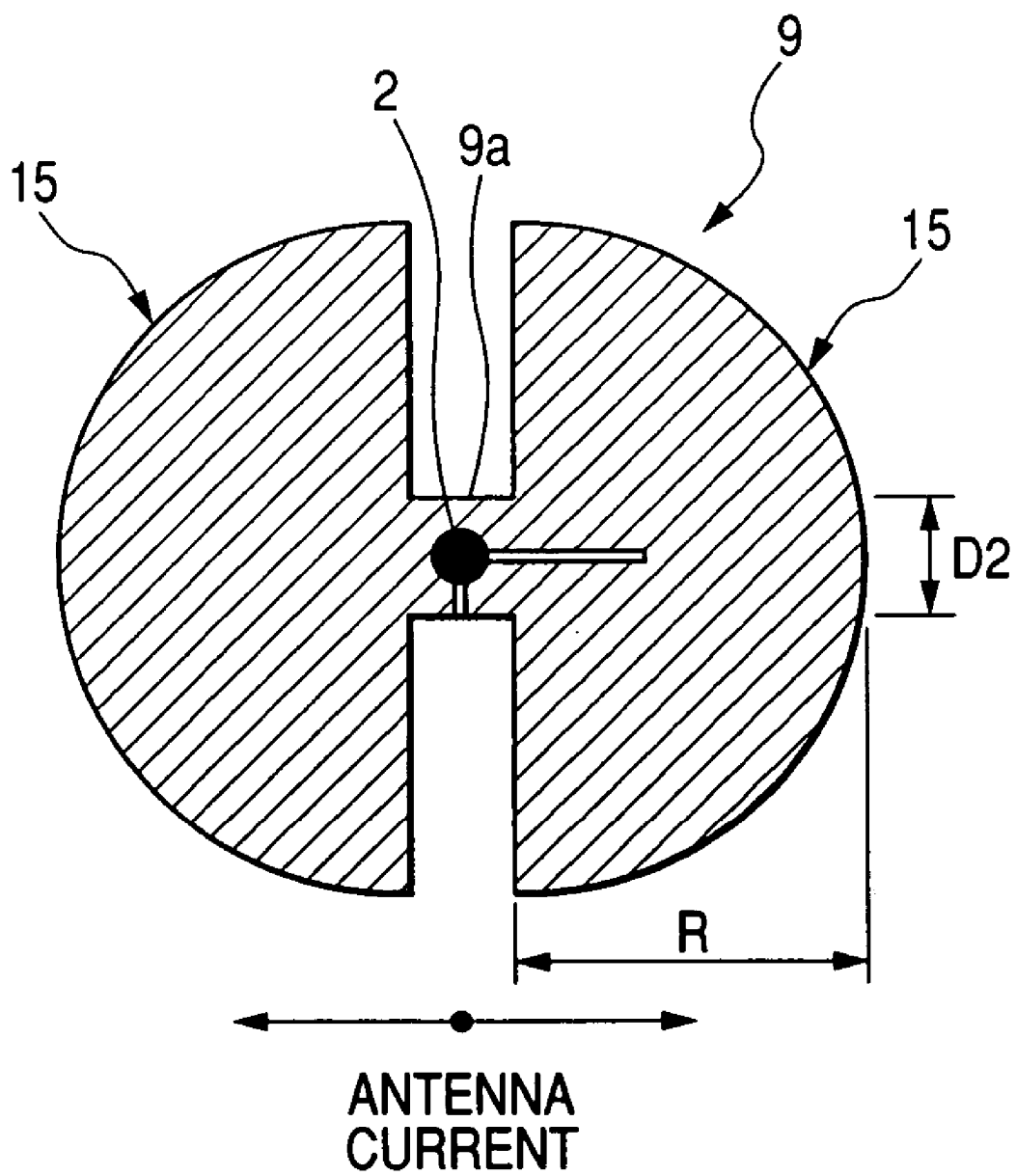
FIG. 5 is a plan view illustrating an O type antenna used in a radio frequency IC tag according to a second embodiment of the present invention.

FIG. 5 is a plan view illustrating an O type (dumbbell or oval type) antenna used in a radio frequency IC tag according to a second embodiment of the present invention. As shown in FIG. 5, an O type antenna 9 having a generally circular or oval shape has a configuration in which the central part 9a between two pieces of semicircular metal foil 15 having a radius of R is connected with rectangular metal foil having a width of D2. The rectangular metal foil part is equipped with the IC chip 2 to form a radio frequency IC tag. When an antenna current flows from the IC chip 2 of the O type antenna 9 having such a shape toward a direction indicated by an arrow in FIG. 5, the maximum current flows in the central part 9a (the part equipped with the IC chip 2 which forms a power-feeding part), and the antenna current then flows toward semicircular parts 15 at both sides, which act as radiation parts. As a result, the electromagnetic energy of the semicircular parts 15 at both sides surrounds the IC chip 2, and is thereby concentrated around the IC chip 2. Therefore, even if an O type antenna having small radius R is used, the antenna efficiency increases, leading to an improvement in communication distance. Using a radio frequency IC tag having the O type antenna 9 makes it possible to improve the communication distance even if the radio frequency IC tag is mounted on, for example, a cap of a bolt.

Third Embodiment

What will be described in this embodiment are some variations of radio frequency IC tags in which the shapes of the H type antenna and of the O type antenna described above are changed. In the embodiments described above, the width of the central part of an antenna extending in the longitudinal direction is narrowed to form an H-shaped or O-shaped antenna, and the radio frequency IC tag is equipped with the IC chip in the central part of the antenna. On the contrary, in a radio frequency IC tag according to a third embodiment, a position at which the IC chip is mounted (that is, a constriction) is moved from the central part of the antenna to a desired position so as to form an H type antenna, or an O type antenna, having a changed shape. In another case, the right and left shapes of an H type antenna or of an O type antenna, or the top and bottom shapes of an H type antenna or of an O type antenna, are made asymmetric so as to form the H type antenna, or the O type antenna, having a changed shape. In still another case, part of an antenna radiation surface is provided with an opening or a notch so as to form an H type antenna, or an O type antenna, having a changed shape.

More specifically, as described above, if an IC chip is mounted on a constriction in the central part of the H type antenna, or of the O type antenna, to form a feeding point (that is, a power-feeding part), the electromagnetic energy is concentrated on the constriction, making it possible to achieve the maximum antenna efficiency. However, depending on, for example, a shape of an object to which a radio frequency IC tag is to be attached, a case for storing the radio frequency IC tag may be limited to a particular shape. For example, if an opening and a leg used to attach the case to an object to which the case is to be attached is provided in proximity to the central part of the case for storing the radio frequency IC tag, or if a positioning notch used to attach the case to an object to which the case is to be attached is provided in the outer circumference of the case, a shape of the H type antenna, or of the O type antenna, which is stored in the case, must be changed according to these requirements.

More specifically, in the case of a radio frequency IC tag having a changed shape in which a position at which the IC chip is mounted is not limited to the central part of the H type antenna, or of the O type antenna (in other words, a position at which the IC chip is mounted is asymmetric with respect to the up-and-down direction (the vertical direction), or the right-and-left direction (the horizontal direction), of the H type antenna or of the O type antenna), higher antenna efficiency is achieved as compared with the conventional rectangular antenna (dipole antenna) although the antenna efficiency slightly decreases compared to the embodiments described above. Therefore, if the sufficient communication distance is ensured, it is desirable that when higher priority to the convenience of attaching the case to the object to which the case is to be attached is given, the H type antenna or the O type antenna in the radio frequency IC tag has a changed shape. For this reason, what will be described in the third embodiments are some variations of changed shapes of H type antennas or of O type antennas.

Variations of Asymmetric Shapes of H Type Antennas

Figure 6A:
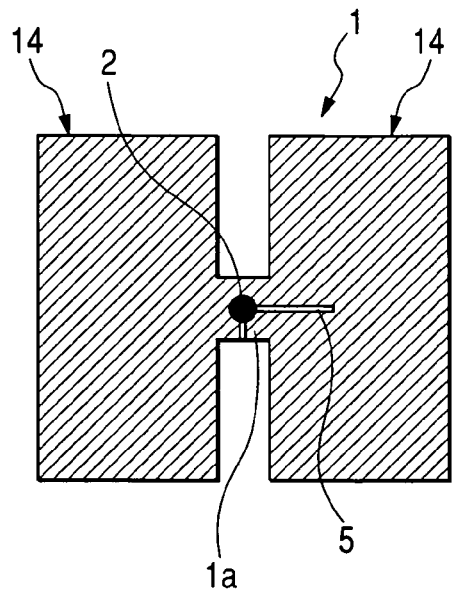
FIGS. 6A through 6D are diagrams illustrating variations of asymmetric shapes of H type antennas according to a third embodiment of the present invention.
Figure 6B:
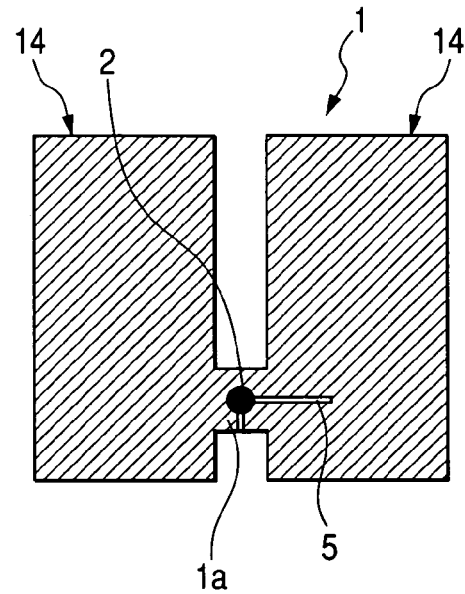

FIGS. 6A through 6D are diagrams illustrating variations of asymmetric shapes of H type antennas according to the third embodiment of the present invention. In contrast to a symmetric radio frequency IC tag, as shown in FIG. 6A, which is a basic type of the H type antenna 1, a constriction 1a of which stays in the central part, variation 1 shown in FIG. 6B is for a power-feeding-point top-and-bottom offset type radio frequency IC tag in which the constriction 1a of the H type antenna 1 is shifted downward (or upward), and in which a slit 5 is formed in the constriction 1a and an IC chip 2 is placed across the slit 5.

Figure 6C:
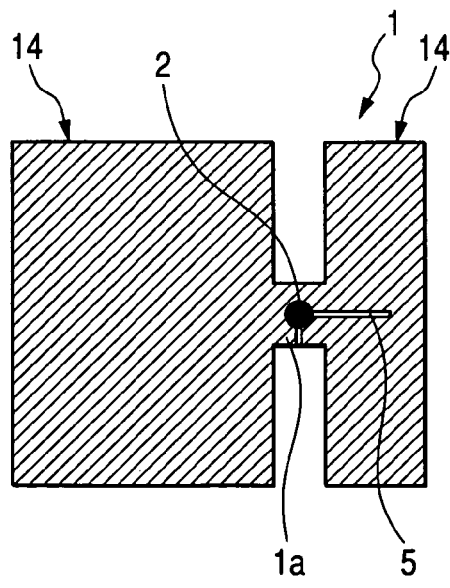
Figure 6D:
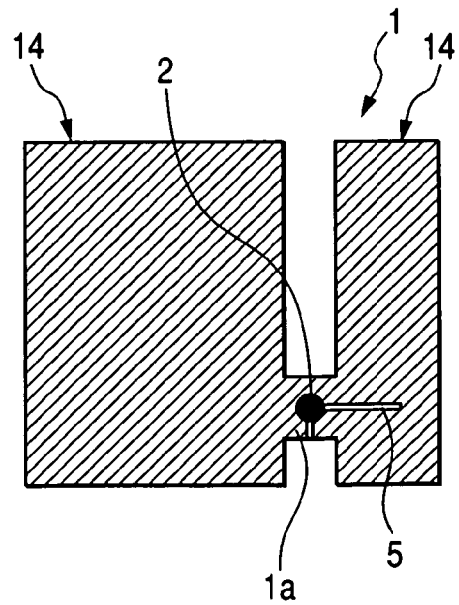

In addition, variation 2 shown in FIG. 6C is for a power-feeding-point right-and-left-offset type radio frequency IC tag in which the radiation parts 14 of the right and left antennas of the H type antenna 1 are made asymmetric with the constriction 1a of the H type antenna 1 not being shifted from the central part in the up or down direction. Moreover, variation 3 shown in FIG. 6D is a power-feeding-point up-and-down right-and-left-offset type radio frequency IC tag in which the radiation parts 14 of the right and left antennas of the H type antenna 1 are made asymmetric with the constriction 1a of the H type antenna 1 being shifted downward (or upward). If the H type antenna having the asymmetric shape as shown in FIGS. 6B, 6C, 6D is used, although the antenna efficiency slightly decreases as compared with the H type antenna having the symmetric shape shown in FIG. 6A, changing an antenna shape in a range within which the required communication distance is ensured makes it possible to satisfy the convenience of attaching the IC tag case to an object to which the case is to be attached.

Variations of Asymmetric Shapes of O Type Antennas

Figure 7A:
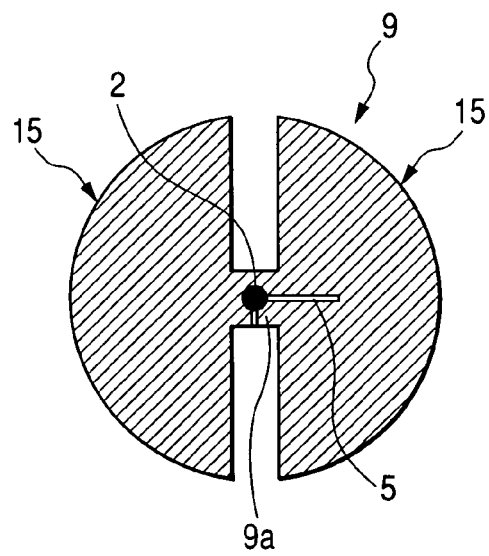
FIGS. 7A through 7D are diagrams illustrating variations of asymmetric shapes of O type antennas according to the third embodiment of the present invention.
Figure 7B:
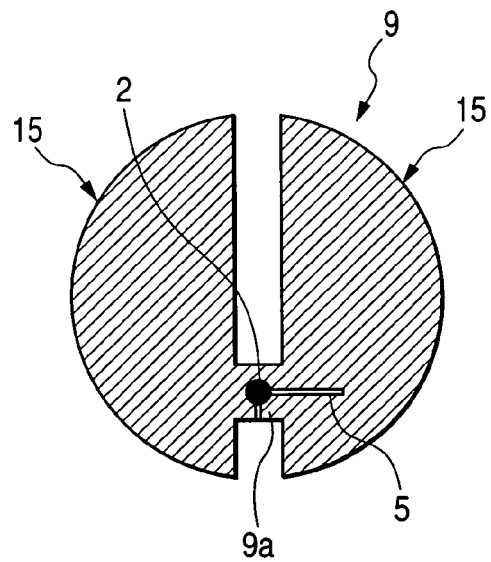

FIGS. 7A through 7D are diagrams illustrating variations of asymmetric shapes of O type antennas according to the third embodiment of the present invention. In contrast to a symmetric radio frequency IC tag, as shown in FIG. 7A, which is a basic type of the O type antenna 9, a constriction 9a of which is located in the central part, variation 1 shown in FIG. 7B is a power-feeding-point top-and-bottom offset type radio frequency IC tag in which the constriction 9a of the O type antenna 9 is shifted downward (or upward), and in which a slit 5 is formed in the constriction 9a and an IC chip 2 is placed across the slit 5.

Figure 7C:
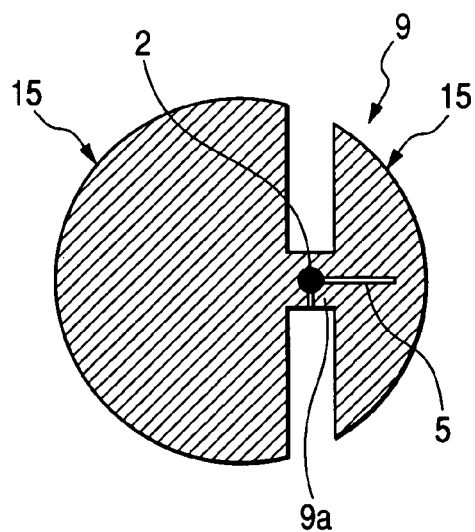
Figure 7D:
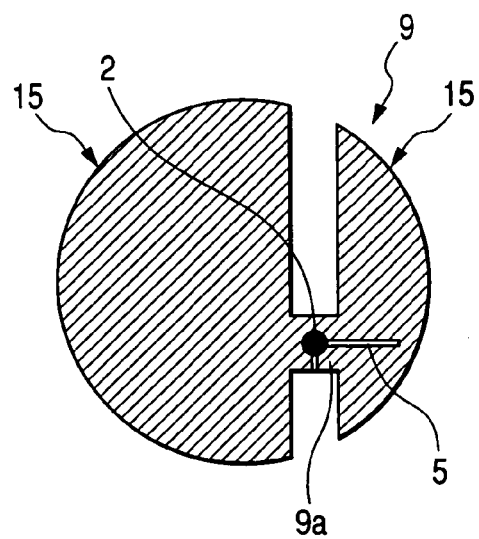

In addition, variation 2 shown in FIG. 7C is a power-feeding-point right-and-left-offset type radio frequency IC tag in which the radiation areas of the right and left antennas of the O type antenna 9 are made asymmetric with the constriction 9a of the O type antenna 9 not being shifted from the central part. Moreover, variation 3 shown in FIG. 7D is a power-feeding-point up-and-down right-and-left-offset type radio frequency IC tag in which the radiation areas 15 of the right and left antennas of the O type antenna 9 are made asymmetric with the constriction 9a of the O type antenna 9 being shifted downward (or upward). If the O type antenna having the asymmetric shape as shown in FIGS. 7B, 7C, 7D is used, although the antenna efficiency slightly decreases as compared with the O type antenna having the symmetric shape shown in FIG. 7A, changing an antenna shape in a range within which the required communication distance is ensured makes it possible to satisfy the convenience of attaching the IC tag case to an object to which the case is to be attached.

Embodiment of an O Type Antenna having an Asymmetric Shape

Figure 8:
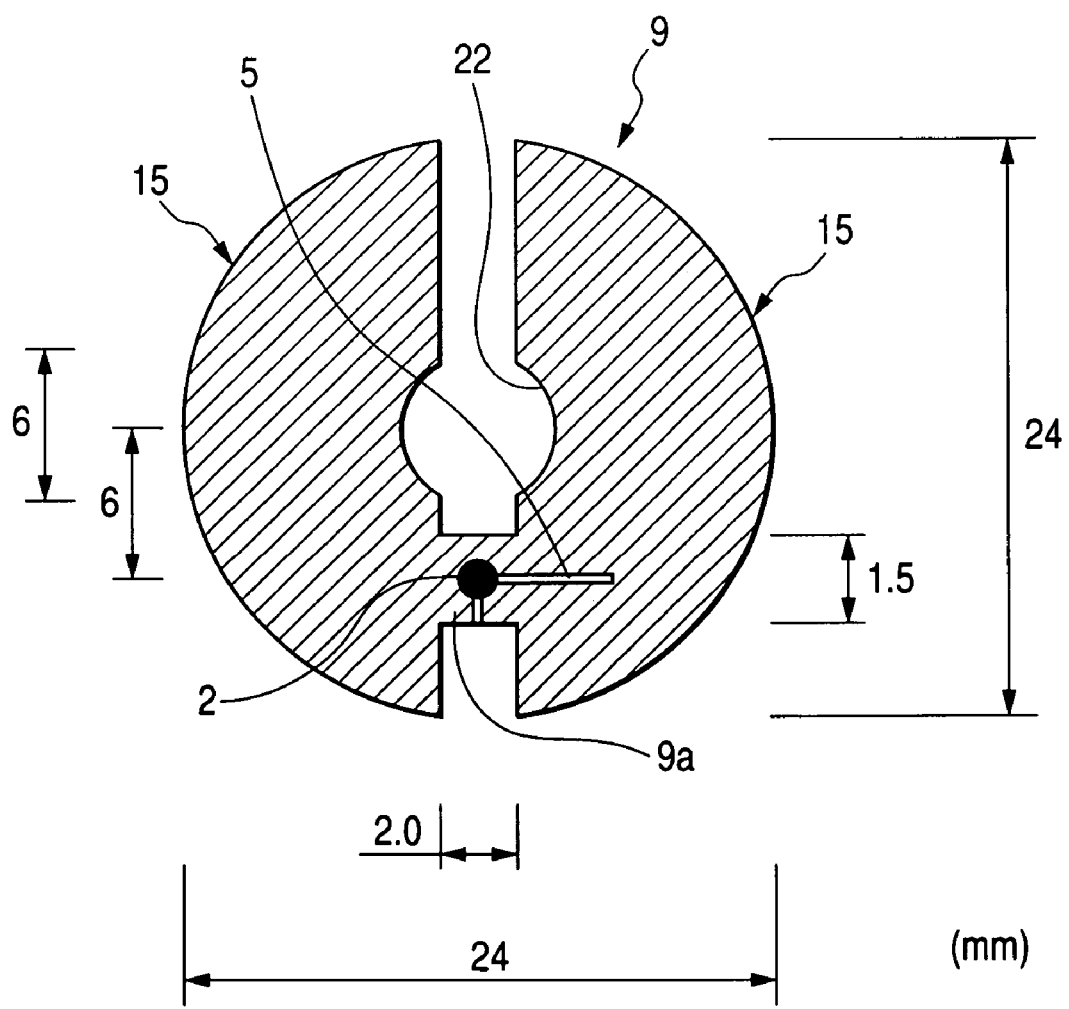
FIG. 8 is an outline drawing illustrating one embodiment of an O type antenna having an asymmetric shape, which is applied to the third embodiment of the present invention.

FIG. 8 is an outline drawing illustrating one embodiment of an O type antenna having an asymmetric shape, which is applied to the third embodiment of the present invention. As shown in FIG. 8, the outside diameter of the O type antenna 9 is 24 mm; and the central part of the O type antenna 9 is provided with an empty part or opening 22 having a diameter of 6 mm, into which a leg of the IC tag case (not shown) may be inserted. Therefore, the constriction 9a having a width of 1.5 mm and a length of 2.0 mm is provided at a position that is shifted from the center of the O type antenna 9 by 6 mm. The constriction 9a connects between the right-half and left-half of the antenna radiation parts 15. In addition, a key-shaped slit 5 having a width of 0.15 mm is formed in proximity to the center of the constriction 9a. Incidentally, is has been confirmed by an experiment that the O type antenna having the shape as shown in FIG. 8 is capable of achieving the communication distance of 100 mm.

Variations of Openings of H Type Antennas

Figure 9A:
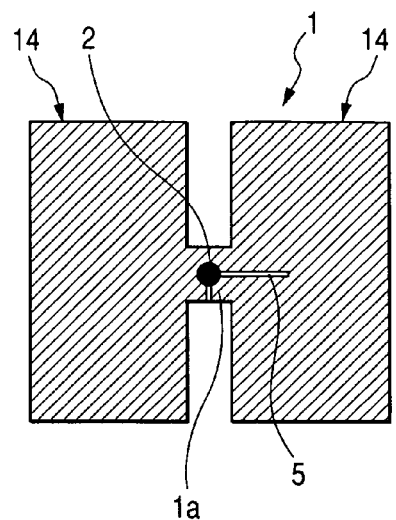
FIGS. 9A through 9D are diagrams illustrating variations of openings of H type antennas according to the third embodiment of the present invention.
Figure 9B:
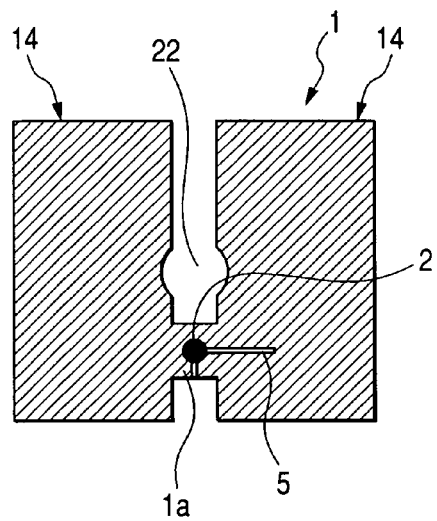

FIGS. 9A through 9D are diagrams illustrating variations of openings of H type antennas according to the third embodiment of the present invention. In contrast to a symmetric radio frequency IC tag, as shown in FIG. 9A, which is a basic type of the H type antenna 1, a constriction 1a of which stays in the central part, variation 1 shown in FIG. 9B is a power-feeding-point top-and-bottom offset type radio frequency IC tag in which the constriction 1a of the H type antenna 1 is shifted downward (or upward), and in which a slit 5 is formed in the constriction 1a, an IC chip 2 is placed across the slit 5, and an opening 22 is formed in proximity to the central part of the H type antenna 1.

Figure 9C:
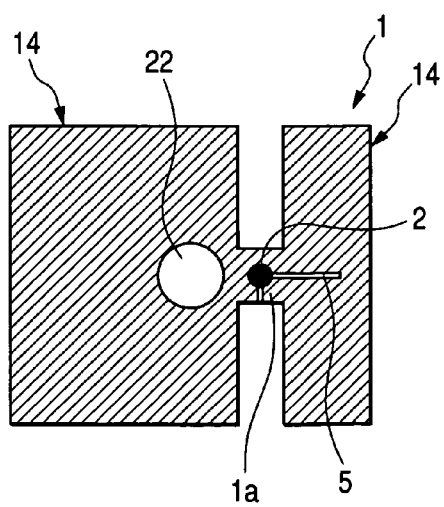

In addition, variation 2 shown in FIG. 9C is a power-feeding-point right-and-left-offset type radio frequency IC tag in which the radiation parts 14 of the right and left antennas of the H type antenna 1 are made asymmetric with the constriction 1a of the H type antenna 1 not being shifted from the central part, and in which the opening 22 is formed in one antenna radiation part 14 (the left antenna radiation part in the FIG. 9C), the radiation area of which is wider than that of the other antenna radiation part 14 of the H type antenna 1. Moreover, variation 3 shown in FIG. 9D is a power-feeding-point top-and-bottom right-and-left-offset type radio frequency IC tag in which a constriction 1a of the H type antenna 1 is shifted downward (or upward) and the radiation area of the right and left antenna radiation parts 14 of the H type antenna 1 are made asymmetric, and in which the opening 22 is formed in one antenna radiation part 14 (the left antenna radiation part in the FIG. 9D), the radiation area of which is wider than that of the other antenna radiation part 14 of the H type antenna 1.

To be more specific, also in the case where the opening 22 exists in the H type antenna 1, a position at which the IC chip 2 is mounted follows the mounted position shown in the variations of asymmetric shapes of H type antennas in FIG. 6. Incidentally, the shape of the opening 22 is not limited to the circle as show in FIG. 9; the shape may also be any type of arbitrary polygon or other desired shape. In addition, it is desirable that depending on a position of the opening 22, the power-feeding point (that is, a position of the constriction 1a) be properly moved. Moreover, the position of the opening 22 can be arbitrarily changed. Further, two or more openings 22 having the same shape, or each having a shape different from one another, may also be formed in the antenna.

Figure 9D:
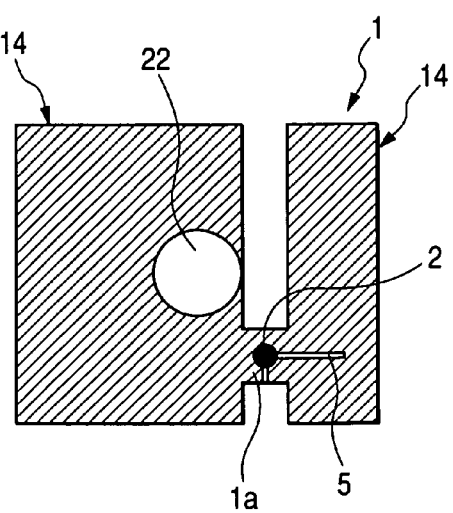

If the H type antenna having the asymmetric shape as shown in FIGS. 9B, 9C, 9D, and having an opening, is used, the antenna efficiency slightly decreases as compared with the case where the H type antenna having the symmetric shape as shown in FIG. 9A is used. However, providing an opening in a range within which the required communication distance is ensured, and changing a shape of the antenna, make it possible to satisfy the convenience of attaching an IC tag case (not shown) to an object to which the case is to be attached.

Variations of Openings of O type Antennas

Figure 10A:
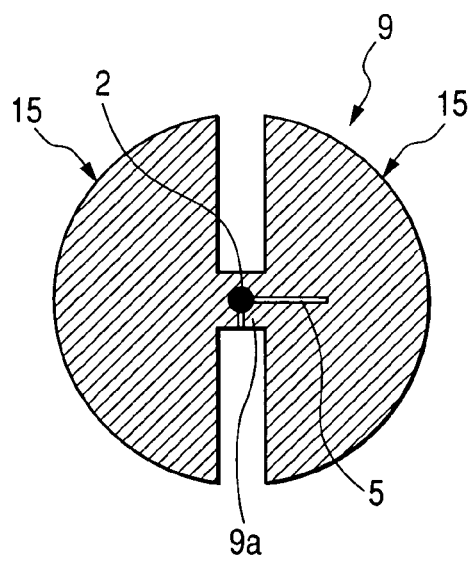
FIGS. 10A through 10D are diagrams illustrating variations of openings of O type antennas according to the third embodiment of the present invention.
Figure 10B:
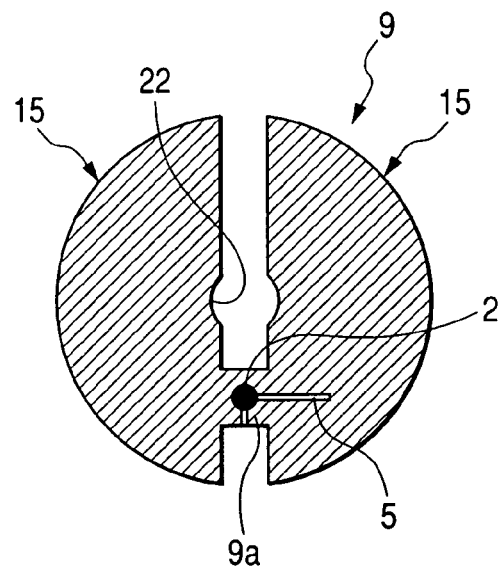

FIGS. 10A through 10D are diagrams illustrating variations of openings of O type antennas according to the third embodiment of the present invention. In contrast to a symmetric radio frequency IC tag, as shown in FIG. 10A, which is a basic type of the O type antenna 1, a constriction 9a of which stays in the central part, variation 1 shown in FIG. 10B is a power-feeding-point top-and-bottom-offset type radio frequency IC tag in which the constriction 9a of the O type antenna 9 is shifted downward (or upward), and in which a slit 5 is formed in the constriction 9a, an IC chip 2 is placed across the slit 5, and an opening 22 is formed in proximity to the central part of the O type antenna 9.

Figure 10C:
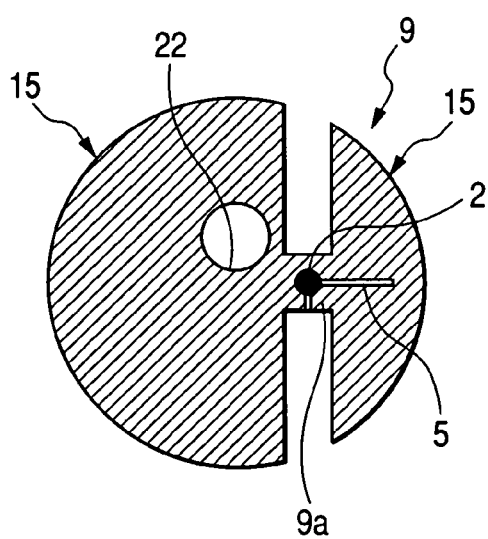

In addition, variation 2 shown in FIG. 10C is a power-feeding-point right-and-left-offset type radio frequency IC tag in which the radiation areas of the right and left antenna radiation parts 15 of the O type antenna 9 are made asymmetric with the constriction 9a of the O type antenna 9 not being shifted from the central part, and in which the opening 22 is formed in one antenna radiation part 15 (the left antenna radiation part in the FIG. 10C), the radiation area of which is wider than that of the other antenna radiation part 15 of the O type antenna 9. Moreover, variation 3 shown in FIG. 10D is a power-feeding-point top-and-bottom right-and-left-offset type radio frequency IC tag in which a constriction 9a of the O type antenna 9 is shifted downward (or upward) and the radiation areas of the right and left antenna radiation parts 15 of the O type antenna 9 are made asymmetric, and in which the opening 22 is formed in one antenna radiation part 15 (the left antenna radiation part in the FIG. 10D), the radiation area of which is wider than that of the other antenna radiation part 15 of the O type antenna 9.

To be more specific, also in the case where the opening 22 exists in the O type antenna 9, a position at which the IC chip 2 is mounted follows the mounted position shown in the variations of asymmetric shapes of O type antennas in FIGS. 7A through 7D. Incidentally, the shape of the opening 22 is not limited to the circle as shown in FIGS. 10B-10D; the shape may also be an arbitrary polygon or other shape. In addition, it is desirable that depending on a position of the opening 22, the power-feeding point (that is, a position of the constriction 9a) be properly moved. Moreover, the position of the opening 22 can be arbitrarily changed. Further, two or more openings 22 having the same shape, or each having a shape different from one another, may also be formed in the antenna.

Figure 10D:
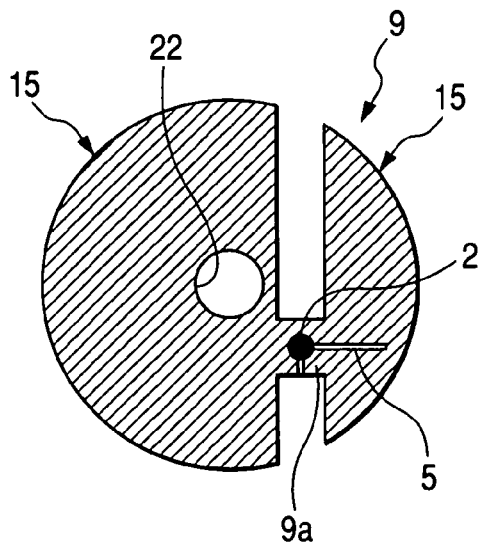
Figure 11A:
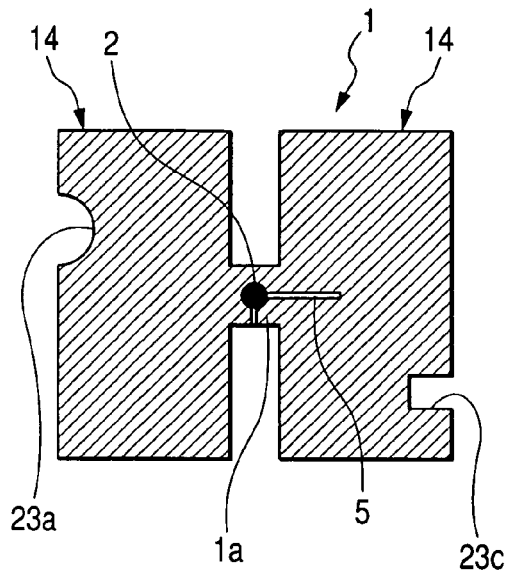
FIGS. 11A through 11D are diagrams illustrating variations of outer circumferential notches of H type antennas according to the third embodiment of the present invention.
Figure 11B:
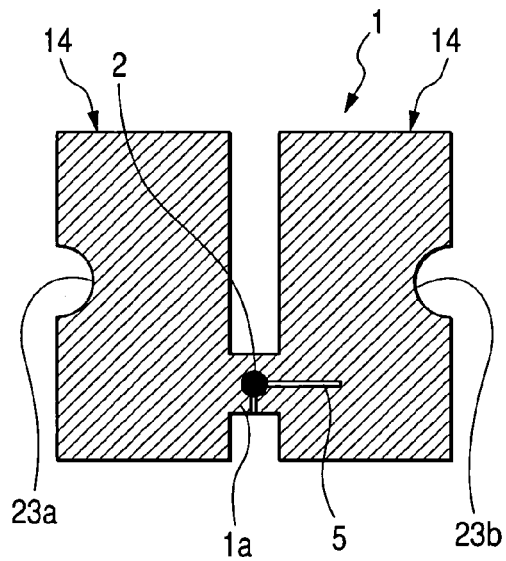

If the O type antenna having the asymmetric shape as shown in FIGS. 10B, 10C, 10D, and having an opening 22, is used, the antenna efficiency slightly decreases as compared with the case where the O type antenna having the symmetric shape as shown in FIG. 10A is used. However, providing an opening in a range within which the required communication distance is ensured, and changing a shape of the antenna, make it possible to satisfy the convenience of attaching an IC tag case (not shown) to an object to which the case is to be attached.

Variations of Outer Circumferential Notches of H Type Antennas FIGS. 11A through 11D are diagrams illustrating variations of outer circumferential notches of H type antennas according to the third embodiment of the present invention. As shown in FIG. 11A, in the basic H type antenna 1, the constriction 1a of which exists in the center to form a symmetric shape, it is also possible to provide a notch having an arbitrary shape on the outer circumference of each of the right and left antenna radiation parts 14. For example, in the H type antenna 1 shown in FIG. 11A, a semicircular notch 23a is formed in the upper part on the outer periphery of the antenna radiation part 14 on the left side, and in addition, a rectangular notch 23c is formed in the lower part on the outer periphery of the antenna radiation part 14 on the right side. In addition, variation 1 shown in FIG. 11B is for a power-feeding-point top-and-bottom-offset type radio frequency IC tag in which the constriction 1a of the H type antenna 1 is shifted downward, a slit 5 is formed in the constriction 1a, the IC chip 2 is placed across the slit 5, and semicircular notches 23b, 23a are further formed in proximity to the central part on the outer periphery of the right and left antennas radiation parts 14 of the H type antenna 1, respectively.

Figure 11C:
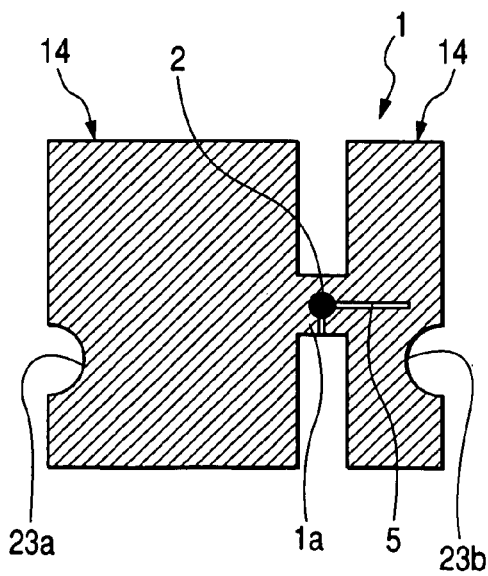
Figure 11D:
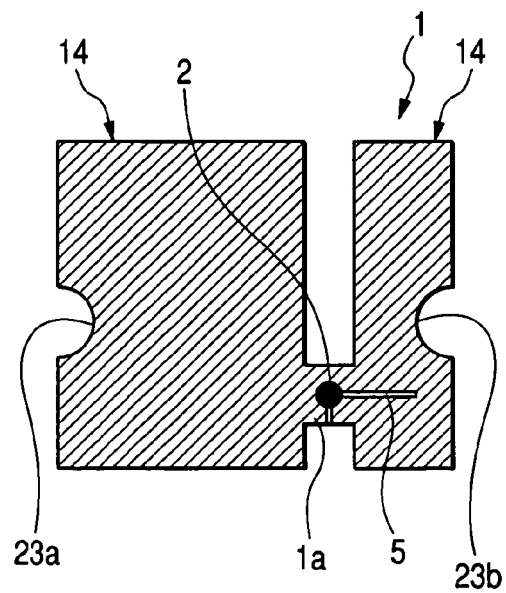
Figure 12A:
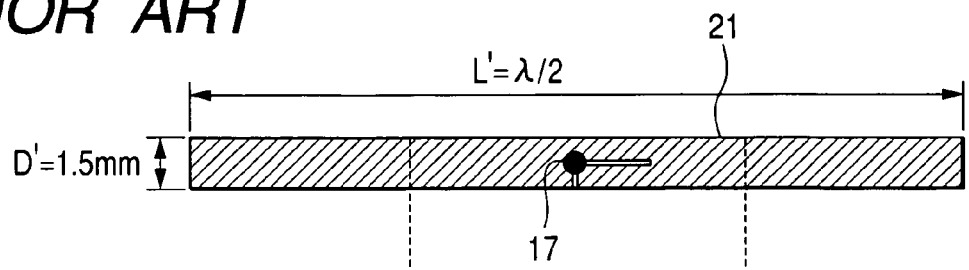
FIGS. 12A, 12B are diagrams each illustrating a configuration of a dipole antenna used in the conventional radio frequency IC tag.
Figure 12B:
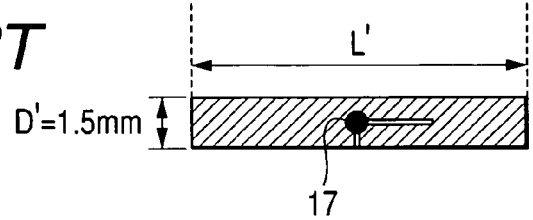
Figure 13:
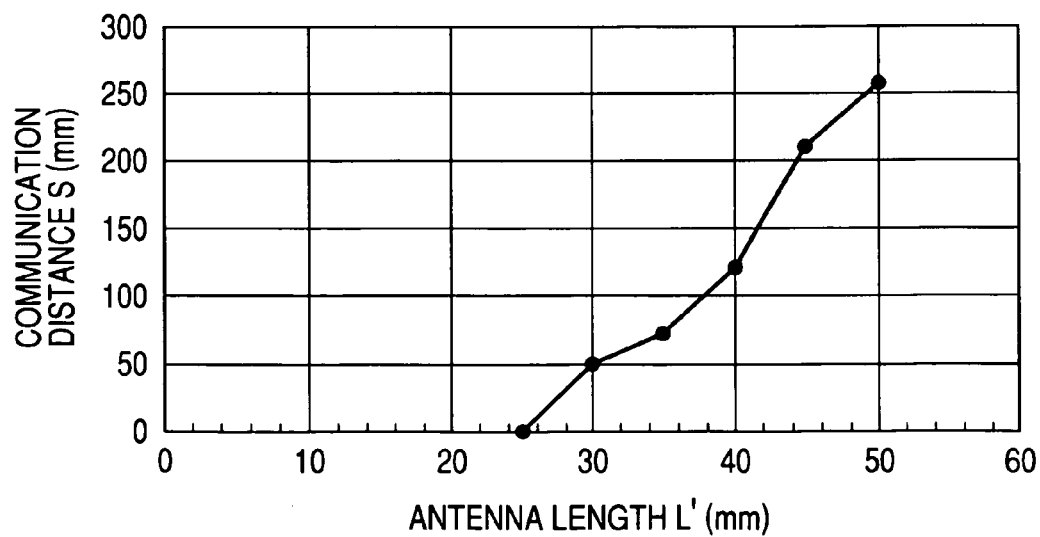
FIG. 13 is a diagram representing characteristics of a dipole antenna having a shape as shown in FIGS. 12A-12B, and illustrates the relationship between the antenna length L' (in mm) and the communication distance S (in mm).

Moreover, variation 2 shown in FIG. 11C is a power-feeding-point right-and-left-offset type radio frequency IC tag in which the areas of the right and left antenna radiation parts 14 of the H type antenna 1 are made asymmetric with the constriction 1a of the H type antenna 1 not being shifted from the central part in the up-and-down direction, and semicircular notches 23b, 23a are further formed in proximity to the lower parts on the outer periphery of the right and left antenna radiation parts 14 of the H type antenna 1 respectively. Further, variation 3 shown in FIG. 11D is for a power-feeding-point top-and-bottom right-and-left-offset type radio frequency IC tag in which the radiation areas of the right and left antennas of the H type antenna 1 are made asymmetric with the constriction 1a of the H type antenna 1 being shifted downward, and semicircular notches 23b, 23a are further formed in proximity to the central parts on the outer periphery of the right and left antenna radiation parts 14 of the H type antenna 1 respectively.

To be more specific, also in the case where the notches exist on the outer periphery of the H type antenna 1, a position at which the IC chip 2 is mounted follows the variations of asymmetric shapes of H type antennas in FIGS. 6A through 6D, respectively. Incidentally, the shape of the notch is not limited to a circle, and accordingly the shape may also be any arbitrary polygon. In addition, it is desirable that depending on positions of the notches, the power-feeding point (that is, a position of the constriction 1a) be properly moved. Moreover, the positions of the notches can be arbitrarily changed. Moreover, a plurality of notches may exist, and a notch and an opening may coexist. Moreover, a shape of the notch in the right antenna radiation part 14 of the H type antenna 1 may differ from that of the notch in the left antenna radiation part 14; and shapes of a plurality of notches in the right antenna radiation part may differ from those of a plurality of notches in the left antenna radiation part. It is to be noted that positions of notches in the right and left antenna radiation parts need not always be symmetric. In addition, the number of notches in the right and left antenna radiation parts may be arbitrary.

Summary of Changed Antennas in the Third Embodiment

As described above, when a radio frequency IC tag is realized by use of the changed antenna into which the H type antenna or the O type antenna is changed, the convenience of storing a radio frequency IC tag in a case is improved although the antenna efficiency slightly decreases as compared with the basic H type antenna (illustrated in FIG. 1), or the basic O type antenna (illustrated in FIGS. 5 and 7A), the constriction of which is provided in the center. For example, providing an opening which is for example required to attach a case to a position in proximity to the central part of the radio frequency IC tag, and providing a notch on the outer circumference of the antenna so as to position the radio frequency IC tag, make it possible to remarkable improve the workability of attaching the radio frequency IC tag to an object to which the radio frequency IC tag is to be attached.

To realize such a changed antenna intended for the convenience of attaching, what is required is to use an asymmetric H type antenna, or an asymmetric O type antenna, in which a radiation part is provided with a circular or polygonal opening, and in which a power-feeding point is moved from the center toward an edge. In another case, antennas which may be used for the above-mentioned purpose also include an asymmetric H type antenna, or an asymmetric O type antenna, in which a radiation part is provided with a circular or polygonal opening at an arbitrary position thereof, and in which a power-feeding point is moved from the central part toward the edge. In still another case, antennas which may be used for the above-mentioned purpose also include an asymmetric H type antenna, or an asymmetric O type antenna, in which the antenna is provided with a notch on the outer circumference thereof and a radiation part is also provided with a circular or polygonal opening at an arbitrary position therein if necessary, and in which a power-feeding point is moved from the central part toward the edge. Incidentally, if only the notch on the outer circumference of the antenna is required whereas an opening in the antenna is not required, it is desirable that a power-feeding point be placed in the center to increase the antenna efficiency as much as possible.

Taking some variations as examples, the shapes of the H type antennas, or the shapes of the O type antennas, were described. However, the shapes of the antennas are not limited to them. The shape can be changed into various shapes. For example, four angle parts of the H type antenna 1 shown in FIG. 1 may also be cut to form a quadrangular shape. In addition, although it is common to the H type antenna and the O type antenna, the constriction 1a shown in FIGS. 6A through 6D or the constriction 9a shown in FIGS. 7A through 7D needs not be perpendicular to both side radiation parts, and accordingly the constriction 1a or 9a may also be obliquely arranged.

Incidentally, the present invention described above can be changed in various manners within a range of the technique thought thereof. For example, the present invention can also be applied to a ROM (Read Only Memory) type radio frequency IC tag, or a RAM (Random Access Memory) type radio frequency IC tag. Additionally, the radio frequency IC tag may also be used for any kind of purpose.

According to the radio frequency IC tags described in the above-mentioned embodiments, using the antenna in which a power-feeding part in the central part equipped with the IC chip has a rectangular constriction shape, and in which radiation parts at both sides have a widened shape, for example, using the H-shaped antenna, makes it possible to efficiently concentrate the electromagnetic energy on peripheral parts of the antenna, which surround the IC chip. Therefore, even if the length of the antenna is shortened, it is possible to lengthen the communication distance of the IC chip. As a result, it is possible to miniaturize the radio frequency IC tag without sacrificing communication performance. In addition, according to the radio frequency IC tags described in the above-mentioned embodiments, it is possible to make an attaching method for attaching a radio frequency IC tag to a case flexible by moving a narrowed power-feeding part of the antenna, on which an IC chip is mounted, from the central part of the antenna to an arbitrary position, or by making a shape of the H type antenna or that of the O type antenna asymmetric in the up-and-down direction or in the right-and-left direction, or both, or by providing an antenna radiation surface (radiation parts) with an opening and/or a notch. As a result, because it is possible to easily store a radio frequency IC tag in a case having a shape that is most suitable for an object to which the case is to be attached, the assembly process of the radio frequency IC tag is simplified and, the usability of the radio frequency IC tag is also remarkably improved. Moreover, it is possible to easily manufacture such a radio frequency IC tag.

Combinations of the above embodiments, variations thereof, and other embodiments not specifically described herein will be apparent to those of skill in the art upon reviewing the foregoing disclosure. Thus, while specific embodiments have been illustrated and described in this specification as examples of the best mode of the invention presently contemplated, those of ordinary skill in the art will appreciate that any arrangement that is calculated to achieve the same purpose may be substituted for the specific embodiments disclosed. Accordingly, the scope of the invention should properly be determined with reference to the appended claims, along with the full range of equivalents to which such claims are entitled.

What is claimed is:

1. A radio frequency IC tag comprising:
   an IC chip having information stored thereon for transmission; and
   an antenna serving to radiate by electromagnetic transmission the information that is stored on the IC chip;
   wherein:
   in said antenna, a power-feeding part equipped with the IC chip has a longitudinal axis along a direction in which an electric current flows, and radiation parts are formed so that a width of said radiation parts becomes wider than that of the power-feeding part with respect to the longitudinal axis of the power-feeding part, said radiation parts extending from the power-feeding part at both sides thereof along the direction in which the electric current flows, the power feeding part being provided with an L-shaped slit for attaining an impedance matching between said IC chip and said antenna, and each of terminals of said IC chip being connected to each end of said power feeding part across said L-shaped slit.

2. A radio frequency IC tag according to claim 1, wherein said antenna has an H shape defined by the power-feeding part and the radiation parts.

3. A radio frequency IC tag according to claim 2, wherein the power-feeding part and the radiation parts are electrically connected each other.

4. A radio frequency IC tag according to claim 2, wherein the power-feeding part and the radiation parts are continuously connected each other with a conductor.

5. A radio frequency IC tag according to claim 2, wherein: an insulation material is provided between the power-feeding part and the radiation parts, and the power-feeding part and the radiation parts are coupled each other by means of electrostatic capacitive coupling.

6. A radio frequency IC tag according to claim 1, wherein:
   in said antenna, each of the radiation parts extending from both sides of the power-feeding part is formed in a semi-circular shape, and the power-feeding part and the radiation parts together form a circular shape.

7. A radio frequency IC tag according to claim 1, wherein said power-feeding part is provided at a position where the radiation parts are symmetric in the up and down direction and also in the right and left direction.

8. A radio frequency IC tag according to claim 1, wherein said power-feeding part is provided at a position where the radiation parts become asymmetric at least either in the up-and-down direction or in the right-and-left direction.

9. A radio frequency IC tag according to claim 8, wherein at least one radiation part is provided with openings different in shape at arbitrary positions thereof.

10. A radio frequency IC tag according to claim 9, wherein the openings are a circle or a polygon in shape.

11. A radio frequency IC tag according to claim 10, wherein the power-feeding part is positioned in association with a position of one or more openings with which at least one of the radiation parts is provided.

12. A radio frequency IC tag according to claim 8, wherein:
    at least one radiation part is provided with at least one opening at an arbitrary position thereof, and at least one radiation part is provided with at least one notch at an arbitrary position on the circumference thereof.

13. A radio frequency IC tag according to claim 12, wherein the opening has the same shape as that of the notch.

14. A radio frequency IC tag according to claim 12, wherein the opening has a shape different from that of the notch.

15. A radio frequency IC tag according to claim 7, wherein at least one radiation part is provided with at least one opening at an arbitrary position thereof.

16. A radio frequency IC tag according to claim 7, wherein at least one radiation part is provided with notches different in shape at arbitrary positions on the outer periphery thereof.

17. A radio frequency IC tag according to claim 7, wherein at least one radiation part is provided with at least one notch at an arbitrary position on the outer periphery thereof.

18. A radio frequency IC tag according to claim 17, wherein the at least one notch is a circle or a polygon in shape.

19. A radio frequency IC tag according to claim 17, wherein the power-feeding part is positioned in association with the position of the at least one notch with which the radiation part is provided on the outer circumference thereof.

20. A radio frequency IC tag according to claim 1, wherein the power-feeding part and the radiation parts are electrically connected each other.

21. A radio frequency IC tag according to claim 1, wherein the power-feeding part and the radiation parts are continuously connected each other with a conductor.

22. A radio frequency IC tag according to claim 1, wherein:
    an insulation material is provided between the power-feeding part and the radiation parts, and the power-feeding part and the radiation parts are coupled each other by means of electrostatic capacitive coupling.

23. A radio frequency IC tag comprising:
    an IC chip having information stored thereon for transmission; and
    an antenna serving to radiate by electromagnetic transmission the information that is stored on the IC chip;
    wherein:
    in said antenna, a power-feeding part equipped with the IC chip has a longitudinal axis along a direction in which an electric current flows, and radiation parts are formed so that a width of said radiation parts becomes wider than that of the power-feeding part with respect to the longitudinal axis of the power-feeding part, said radiation parts extending from the power-feeding part at both sides thereof along the direction in which the electric current flows wherein an insulation material is provided between the power-feeding part and the radiation parts, and the power-feeding part and the radiation parts are coupled each other by means of electrostatic capacitive coupling.

24. A radio frequency IC tag comprising:

an IC chip having information stored thereon for transmission; and an antenna serving to radiate by electromagnetic transmission the information that is stored on the IC chip, wherein:

in said antenna, a power-feeding part equipped with the IC chip has a longitudinal axis along a direction in which an electric current flows, and radiation parts are formed so that a width of said radiation parts becomes wider than that of the power-feeding part with respect to the longitudinal axis of the power-feeding part, said radiation parts extending from the power-feeding part at both sides thereof along the direction in which the electric current flows, the power feeding part being provided with an L-shaped slit for attaining an impedance matching between said IC chip and said antenna, and each of terminals of said IC chip being connected to each end of said power feeding part across said L-shaped slit, and an insulation material is provided between the power-feeding part and the radiation parts, and the power-feeding part and the radiation parts are coupled each other by means of electrostatic capacitive coupling.

25. A radio frequency IC tag according to claim 24, wherein said antenna has an H shape defined by the power-feeding part and the radiation parts.

* * * * *